No. 756,888. PATENTED APR. 12, 1904.
A. M. PLAISSETTY.
MANUFACTURE OF THREADS FOR INCANDESCENT MANTLES OR ILLUMINATING BODIES.
APPLICATION FILED MAR. 14, 1902.
NO MODEL.

Formed from an Emulsion of the Rare Earths and a Solution of Celulose in Cupra Ammonium.

No. 756,888. Patented April 12, 1904.

UNITED STATES PATENT OFFICE.

ACHILLE M. PLAISSETTY, OF PARIS, FRANCE.

MANUFACTURE OF THREADS FOR INCANDESCENT MANTLES OR ILLUMINATING-BODIES.

SPECIFICATION forming part of Letters Patent No. 756,888, dated April 12, 1904.

Application filed March 14, 1902. Serial No. 98,273. (No model.)

*To all whom it may concern:*

Be it known that I, ACHILLE M. PLAISSETTY, engineer, a citizen of the United States, residing at 158 Rue de Courcelles, Paris, France, have invented a new and useful Improvement in the Manufacture of Threads for Incandescent Mantles or Illuminating-Bodies, of which the following is a specification.

The incandescent mantles or illuminating-bodies obtained from cotton threads do not possess sufficient elasticity and strength and after burning for several hours lose from twenty-five to thirty per cent. of their illuminating power. These disadvantages are the consequence of the fact that the amount of organic matter contained in the cotton threads impregnated with rare earths is large in relation to the amount of inorganic matter, and therefore the illuminating-body obtained by the use of cotton threads shows a porous and tubular structure after its incineration. During the incandescence such mantles shrink and decrease in volume and radiating-surface. A further disadvantage consists in the fact that the cotton fiber does not absorb the rare earths equally nor in large quantities. Also the amount of these earths is not equally distributed throughout the remaining net or mantle, whereby the lighting power is considerably diminished. Finally, these impregnated cotton threads are very hygroscopic and have to be dried at a relatively high temperature, and in consequence the acids contained in the impregnating-salts of rare earths considerably attack the vegetable fiber, so that the mantle cannot be preserved in this condition for a sufficiently long time.

The object of this invention is to obtain threads which are destined to form illuminating mantles or bodies being free from the above-mentioned disadvantages.

I have shown an illuminating-body composed of filaments produced in accordance with my invention in the accompanying drawings, wherein—

Figure 1:
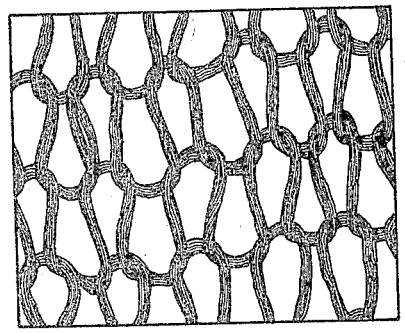
Figure 2:
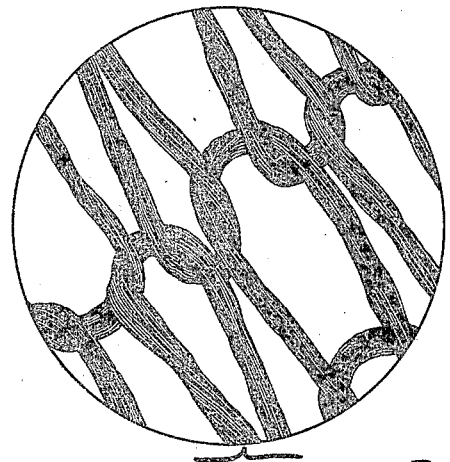

Figure 1 is a view showing a mantle formed of a filament produced in accordance with my invention, said filament being enlarged sixteen diameters. Fig. 2 is a similar view showing the filament enlarged thirty-six diameters.

In order to attain the desired objects of my invention, I add the oxids, hydroxids, or the like compounds of the rare earths to a solution of cellulose in ammoniacal solution of cupric oxid—for instance, in the well-known Schweitzer's reagent. Then I mix these oxids, hydroxids, or the like intimately with the ammoniacal solution of cupric oxid, from which mixture by forcing it through fine openings I obtain filaments which are qualified for forming tissues destined for the manufacture of incandescent mantles or other illuminating-bodies.

I preferably prepare the above-mentioned Schweitzer's reagent by passing a current of air through a solution of ammonia containing small chips of copper in suspension; but I can also take any other similar liquor, which I prepare by dissolving cupric oxid or carbonates or hydrocarbonates of copper in liquid ammonia. In these concentrated copper solutions I dissolve the cellulose, preferably in the form of paper. I preferably accelerate the solution by stirring the liquor and by applying a cellulose of great purity minutely separated. I filter the obtained cellulose solution of the impurities in the manner usual in the filtration of liquors containing collodion (nitrocellulose) which are destined for the manufacture of artificial silk. For instance, I squeeze the mixture containing the cellulose-copper solution and the rare earths through fabric the meshes of which are finer than the openings of the machine which I use afterward for spinning threads. Into the filtered solution I intimately incorporate the hydroxids of the incandescent salts, preferably in a gelatinous form. The proportions of salts or other compounds I employ depend upon the nature and the concentration of the rare-earth compounds used—*i. e.*, upon the amount of anhydrous oxids they contain—and further depend upon the amount of rare earths I wish to be contained in the illuminating-bodies after incineration.

Care must be taken that the mixture of the salts or other compounds of the rare earths with the cellulose solution is as intimate as possible, because a good result of the present process depends upon this mixing.

In order to prepare filaments from the obtained mixture to be used for weaving a fabric destined for incandescent mantles or other illuminating-bodies, I introduce this mixture in strong vessels having openings which are provided with capillary tubes dimensioned according to the diameter which I desire to give the filaments. I force the mixture through the capillary openings of the said vessels by pressure, so that it issues in form of jets or filaments. Then I pass these fine and viscous jets or filaments through a bath suitable for coagulating the mixture of which the jets or filaments are composed without dissolving the oxids of the rare earths contained therein.

Generally I prefer to coagulate the threads in a bath containing from five to ten or more per cent. of cyanid of potash or cyanid of soda, in which bath the filaments lose a part of the copper and ammonia they contain. However, I do not limit myself to these solutions of cyanid of potash or soda as coagulating-baths for the filaments or threads obtained by my process; but I can employ any other suitable bath—for instance, such containing hydroxylamin or its salts and the like or baths containing methylic or ethylic alcohol and the like and generally all kinds of neutral or alkaline reducing-baths which are capable to decompose copper-ammonia solutions by transforming the cupric compounds therein contained to cuprous compounds.

The filaments after they have been coagulated by any of the above-mentioned baths pass through tanks containing cold or hot water, which should be renewed continuously in order to completely free the filaments of the copper and ammonia they contain. To obtain this result, it will be necessary to employ several water-tanks and to regulate carefully the time of circulating the filaments through the water-tanks. After carefully washing out the ammonia and copper, which the filaments retain energetically, they are passed through heated drying-stoves until they have acquired the desired degree of dryness. Then they are wound up on bobbins.

In carrying out the above-mentioned steps of my process in practice and in order to assure a uniform result and to regulate the operations I employ machinery to circulate the filaments through the washing and coagulating baths and to circulate the filaments in the drying-stoves and to wind them up on the bobbins. This machinery resembles the well-known machinery hitherto employed for spinning humid threads of collodion, (nitrocellulose.)

In some cases I prefer to employ instead of the above-described process the following simplified method: The filaments leaving the coagulating-bath pass directly through the drying-stoves. However, I prefer to wash the filaments a little by giving them a short passage through a single tank of water. From there the filaments pass to the drying-stoves and then to the bobbins. In order to remove all the copper, I then form skeins of the filaments, which I wash in water or preferably pass first through solutions containing ammonia or cyanid of potash or soda to make the copper compounds contained in the filaments soluble. Then by repeatedly washing the filaments I succeed in eliminating the last traces of copper. After drying, these filaments, only containing cellulose and rare earths, are suitable for the manufacture of incandescent mantles or other illuminating-bodies.

Filaments or threads produced as above described possess great strength and a high and uniform elasticity, and mantles obtained from the use of the same are insensible not only to humidity, but also to water, and consequently are capable of being transported before incineration without deterioration, and as these threads or filaments contain a large percentage of inorganic substances they are not porous or of tubular structure after incineration.

Having now particularly described and ascertained the nature of my said invention and in what manner the same is to be performed, I declare that what I claim is—

1. Process of manufacturing filaments destined for the manufacture of incandescent mantles consisting in incorporating the rare earths in solutions of cellulose and copper-ammonia compounds and then forcing the obtained mixture through small openings.

2. The process of manufacturing filaments for incandescent mantles, consisting in precipitating hydrated oxids out of solutions of compounds of the rare earths by the addition of an alkali, then incorporating these oxids in a solution of cellulose and copper ammonia, and finally forcing the obtained mixture through small openings, as and for the purpose set forth.

3. The process of producing filaments for use in the manufacture of incandescent mantles, consisting in precipitating hydrated oxids out of solutions of compounds of the rare earths by the addition to such solutions of ammonia, then incorporating the precipitated oxids intermittently in a solution of cellulose in copper ammonium, and finally forcing the obtained viscous compound through small openings to form the filaments, as and for the purpose set forth.

4. The process of producing filaments for use in the manufacture of incandescent mantles, consisting in precipitating hydrated oxids out of solutions of compounds of the rare earths by the addition to such solutions of ammonia, then incorporating the precipitated oxids intermittently in a solution of cellulose in copper ammonium, then forcing the obtained viscous compound through small openings to form the filaments, and finally coagulating the said filaments, as and for the purpose set forth.

5. The process of producing filaments for use in the manufacture of incandescent mantles, consisting in precipitating hydrated oxids out of solutions of compounds of the rare earths by the addition of ammonia, then intermittently incorporating these oxids in a solution of cellulose dissolved in copper ammonium, then forcing the viscous fluid thus obtained through small openings, and finally coagulating the resulting filaments in an alkaline bath, as and for the purpose set forth.

6. The process of producing filaments for use in the manufacture of incandescent mantles, consisting in precipitating hydrated oxids out of solutions of compounds of the rare earths by the addition of ammonia, then incorporating these oxids in a solution of cellulose dissolved in copper ammonium, then forcing the resulting viscous fluid through small openings to form the filaments, and finally coagulating the filaments in an alcohol-bath, as and for the purpose set forth.

7. The process of producing filaments for use in the manufacture of incandescent mantles, consisting in precipitating hydrated oxids out of solutions of compounds of the rare earths by the addition of ammonia, then incorporating these oxids in a solution of cellulose dissolved in copper ammonium, then forcing the viscous fluid thus obtained through small openings to form the filaments, then subjecting the filaments thus produced to a coagulating-bath, then washing the coagulated filaments in a weak solution of ammonia, and finally drying the same, as and for the purpose set forth.

8. The process of producing filaments for use in the manufacture of incandescent mantles, consisting in dissolving cellulose in a solution of copper ammonia, then incorporating in said solution oxids of illuminating metals, and finally forcing the resulting viscous compound through small openings to form the filaments, as and for the purpose set forth.

9. As an article of manufacture, a material for making incandescent mantles comprising a plastic mass formed of an emulsion of the rare earths, in a solution of cellulose, ammonium and copper salts, as and for the purpose set forth.

In testimony whereof I have affixed my signature in the presence of two witnesses.

ACHILLE M. PLAISSETTY.

Witnesses:
ALBERT FRAIPONT,
GREGORY PHELAN.